United States Patent [19]

Whiteside, Jr. et al.

[11] E Patent Number: Re. 32,951

[45] Reissued Date of Patent: Jun. 13, 1989

[54] PROCESS FOR PREPARING EPOXY RESINS HAVING IMPROVED PHYSICAL PROPERTIES WHEN CURED USING QUATERNARY PHOSPHONIUM CATALYSTS

[75] Inventors: Ross C. Whiteside, Jr., Angleton; Adolphus V. Gist, Lake Jackson, both of Tex.; George A. Doorakian, Bedford, Mass.

[73] Assignee: The Dow Chemical Company, Midland, Mich.

[21] Appl. No.: 509,479

[22] Filed: Jun. 30, 1983

Related U.S. Patent Documents

Reissue of:

[64] Patent No.: 4,352,918
Issued: Oct. 5, 1982
Appl. No.: 212,959
Filed: Dec. 4, 1980

[51] Int. Cl.[4] ..... C08G 59/62

[52] U.S. Cl. ..... 528/89; 525/523; 528/104

[58] Field of Search ..... 528/89, 104; 525/523

[56] References Cited

U.S. PATENT DOCUMENTS

| | | | |
|---|---|---|---|
| 3,306,872 | 2/1967 | Macock et al. | 260/32.8 |
| 3,477,990 | 11/1969 | Dante et al. | 260/47 |
| 3,480,471 | 11/1969 | Rembold | 117/161 |
| 3,679,465 | 7/1972 | Flynn | 117/126 GE |
| 3,687,894 | 9/1972 | Collings et al. | 260/47 EC |
| 3,738,862 | 6/1973 | Klarquist et al. | 117/126 GE |
| 3,931,109 | 1/1976 | Martin | 528/104 X |
| 3,948,855 | 4/1976 | Perry | 260/47 EP |
| 3,998,983 | 12/1976 | Smith | 427/374 R |
| 4,075,260 | 2/1978 | Tsen et al. | 260/830 TW |
| 4,093,650 | 6/1978 | Doorakian et al. | 260/539 A |
| 4,132,706 | 1/1979 | Doorakian et al. | 528/89 |
| 4,168,331 | 9/1979 | Davis | 427/58 |
| 4,171,420 | 10/1979 | Doorakian et al. | 528/89 |
| 4,177,216 | 12/1979 | Doorakian et al. | 260/606.5 F |
| 4,251,594 | 2/1981 | Davis | 428/413 |

FOREIGN PATENT DOCUMENTS

| | | | |
|---|---|---|---|
| 893191 | 2/1972 | Canada | 402/267 |
| 1434889 | 4/1973 | United Kingdom . | |
| 1494971 | 12/1977 | United Kingdom . | |

OTHER PUBLICATIONS

Allowed Application Ser. No. 79,282, filed Jul. 27, 1979, Davis (Now U.S. Pat. No. 4,251,594).

Allowed Application Ser. No. 63,894, filed Aug. 3, 1979, Doorakian.

*Primary Examiner*—Earl A. Nielsen

[57] ABSTRACT

Epoxy resins having improved properties are prepared by reacting an epoxy resin with a dihydric phenol in the presence of a sufficient quantity of a phosphonium catalyst such that the product resulting from reacting a mixture of the catalyst, epoxy resin and dihydric phenol has a % epoxide difference from the theoretical percent epoxide of from about 0.5 to about 4.0.

12 Claims, No Drawings

PROCESS FOR PREPARING EPOXY RESINS HAVING IMPROVED PHYSICAL PROPERTIES WHEN CURED USING QUATERNARY PHOSPHONIUM CATALYSTS

Matter enclosed in heavy brackets [ ] appears in the original patent but forms no part of this reissue specification; matter printed in italics indicates the additions made by reissue.

BACKGROUND OF THE INVENTION

Epoxy resins have heretofore been advanced in the presence of phosphonium catalysts disclosed by Dante in U.S. Pat. No. 3,477,990 and Perry in Canadian Pat. No. 893,191 and U.S. Pat. No. 3,948,855. However, the quantities of catalyst employed were that which would provide a resin having a percent epoxide value sufficiently close to the theoretical epoxide value that no improvement in properties were envisioned.

The process of the present invention provides for the production of advanced epoxy resins having an improvement in one or more physical properties such as, for example, reactivity, glass transition temperature of the cured resins and the like. Resins having faster reactivity characteristics provide for increased productivity of articles produced therefrom over a unit time period. The increase in glass transition temperature of a cured resin permits articles prepared therefrom to be employed in higher temperature environments. Cured epoxy resins having increased glass transition temperatures provide products which can be employed in environments of higher temperatures i.e., the useful operating temperature is generally directly proportional to the glass transition temperature.

SUMMARY OF THE INVENTION

The present invention pertains to an improvement in a process for advancing epoxy resin in molecular weight by reacting (A) an epoxy resin which is a glycidyl ether of a dihydric phenol having an average of more than one glycidyl ether group per molecule with (B) a dihydric phenolic compound in the presence of (C) a phosphonium catalyst employing components (A) and (B) in quantities such that the phenolic hydroxyl to epoxide equivalent ratio is that which will provide a theoretical percent epoxide of the resultant reaction product of from about 2.7 to about 14, preferably from about 7 to about 12.5; wherein the improvement comprises employing the catalyst, component (C) in a quantity such that the epoxy resin which would result when subjecting a mixture of components (A), (B) and (C) to suitable reaction conditions produces an advanced epoxy resin wherein the difference obtained by subtracting the percent epoxide obtained by analysis from the theoretical percent epoxide is from about 0.5 to about 4, preferably from about 1 to about 2; thereby providing an epoxy resin which when cured with a curing quantity of a curing agent provides a composition which has an improvement in one or more of the properties selected from the group consisting of glass transition temperature and increased reactivity.

The present invention also pertains to products resulting from curing a mixture of an epoxy resin prepared by the above procedure and a curing quantity of a curing agent therefor.

The present invention also pertains to an improvement in a process for preparing resin impregnated substrates for use in preparing electrical laminates by a process which comprises:

(I) saturating said substrate with a resin forming mixture comprising;

(A) an epoxy resin having an epoxide equivalent weight of from about 300 to about 600, preferably from about 375 to about 475 which has been prepared by reacting (1) a glycidyl ether of a dihydric phenol having an average of more than one epoxide group per molecule and an epoxide equivalent weight (EEW) of from about 156 to about 400, preferably from about 177 to about 190, with (2) a dihydric phenolic compound in the presence of (3) a phosphonium catalyst for effecting the reaction between (1) and (2), wherein components (1) and (2) are employed in quantities which will provide a theoretical percent epoxide of the reaction product of from about 8 to about 15, preferably from about 9.5 to about 13;

(B) a curing agent for said epoxy resin and (C) a solvent system for Components A and B;

(II) heating the resultant impregnated substrate to B-stage the resin and remove the solvent system;

the improvement which comprises: employing as the catalyst, Component (A-3), a [phosphomium] *phosphonium* salt or complex thereof which has at least one, preferably two, most preferably three aromatic ring(s) attached to the phosphorus atom of the phosphonium group and at least one aliphatic hydrocarbon group attached to said phosphorus atom, said catalyst being employed in a quantity such that the epoxy resin which would result when subjecting a mixture of components (A-1), (A-2) and (A-3) to suitable reaction conditions produces an advanced epoxy resin wherein the difference obtained by subtracting the [precent] *percent* epoxide obtained by analysis from the theoretical percent epoxide is from about 0.5 to about 4, preferably from about 1 to about 2.

DETAILED DESCRIPTION OF THE PREFERRED EMBODIMENTS

Suitable glycidyl ethers of a dihydric phenol which can be employed in the present invention include those represented by the formula

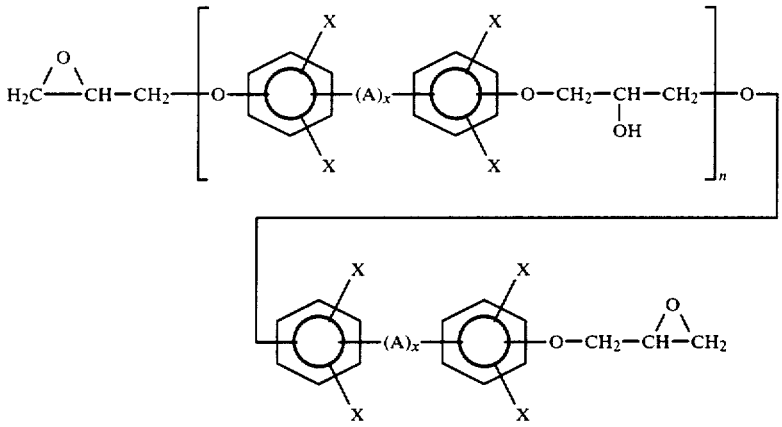

wherein A is a divalent hydrocarbon group having from 1 to about 8 carbon atoms, —S—, —S-S—, —O—,

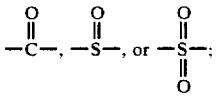

each X is independently hydrogen, chlorine or bromine; x has a value of zero or one and n has a value such that the EEW is from about 156 to about 400, preferably from about 177 to about 190, calculated on the basis of X being hydrogen.

Particularly suitable are the diglycidyl ethers of bisphenol A and tetrabromobisphenol A.

Suitable dihydric phenolic compounds include, for example, catechol, hydroquinone, resorcinol and bisphenols such as those represented by the formula

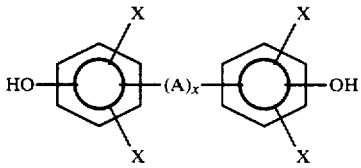

wherein X, A and x are as defined above.

Particularly suitable dihydric phenolic compounds are bisphenol A and tetrabromo bisphenol A.

Suitable phosphonium catalysts which can be employed herein include, for example, those compounds having at least one phosphonium cation group represented by the formula

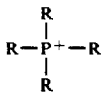

wherein each R is independently a hydrocarbyl or substituted hydrocarbyl group having from 1 to about 20, preferably from 1 to about 6, carbon atoms or substituted hydrocarbyl groups. It is preferred that at least one, preferably two and most preferably three, of the R groups be an aromatic group i.e., an aryl group or an alkaryl group such that the phosphorus atom is attached directly to the aromatic ring of such aryl or alkaryl group.

By the term hydrocarbyl, it is meant that the groups can be alkyl, aryl, alkaryl, aralkyl and the alkyl can be either cyclic or acyclic. By substituted hydrocarbyl it is meant that the hydrocarbyl groups can contain one or more inert substituent groups such as, for example, Cl, Br, I, $NO_2$, mixtures thereof and the like.

The R groups can contain any substituent group which is inert to the system, i.e. will not deactivate the catalyst under the conditions in which they are employed.

It is preferred that the phosphonium cation contain at least one aromatic ring and at least one alkyl group attached directly to a phosphorous atom.

Suitable anions include the halides, such as, for example, Cl, Br, I, carboxylates, dicarboxylates, phosphates, nitrates, sulfates, nitrites, sulfites, borates, chromates, mixtures thereof and the like.

The preferred anions are the strong acids, i.e. those have a $pK_a$ value less than about 4.5, preferably less than about 3.7, because the catalysts containing such are generally more efficient, in that it takes less catalyst to effect the lowering of the epoxide value to the desired value below the theoretical value.

The dihydric phenol and the glycidyl ether of a dihydric phenol are employed in quantities such that the theoretical percent epoxide of the resultant product is from about 2.7 to about 14, preferably from about 7 to about 12.5.

The quantity of catalyst will of course vary depending upon the particular catalyst employed; however, for most catalysts, from about 0.1 to about 1.5, preferably from about 0.2 to about 0.8, parts catalyst by weight per 100 parts by weight of glycidyl ether of dihydric phenol can be employed.

The reaction conditions employed to prepare the advanced epoxy resins can vary, but temperatures of from about 100° C. to about 200° C., preferably from about 120° C. to about 160° C., are suitable. Lower temperatures usually require longer reaction times whereas higher temperatures usually require shorter reaction times.

The pressure employed is not particularly important and can be from about 1 mm Hg vacuum to about 100 psig. However, it is usually preferred to employ pressures of from about 5 psig to about 20 psig.

The particular reaction conditions are not important so long as for the particular phosphonium catalyst and quantity thereof employed, the reaction conditions produce the desired result i.e., the resultant advanced epoxy resin has the required difference between the theoretical percent epoxide and the actual percent epoxide value obtained by analysis.

Any of the well known curing agents can be employed in the present invention to cure the epoxy resins. Such curing agents include amines, amides, guanidines, phenolic hydroxyl-containing materials, carboxylic acids, carboxylic acid anhydrides, imidazoles, biguanides, mixtures thereof and the like.

Particularly suitable curing agents include, for example, guanidines such as for example, dicyandiamide and tetramethyl guanidine and biguanides such as 1,6-xylene biguanide, polyhydric phenols, mixtures thereof and the like.

The quantity of curing agent employed depends upon the particular curing agent employed and the properties desired in the resultant cured resin, all of which is well known by those persons reasonably skilled in the art and discussed in HANDBOOK OF EPOXY RESINS, by Lee and Neville, McGraw Hill, 1967, which is incorporated herein by reference.

The theoretical percent epoxide is calculated by the following formula $$\text{THEORETICAL \% EPOXIDE} = \frac{4300\,(\text{EqER} - \text{EqDHP})}{\text{WtER} + \text{WtDHP}}$$

EqER = epoxide equivalents from the epoxy resin.

EqDHP = phenolic hydroxyl equivalents from the dihydric phenol.

WtER = weight of epoxy resin employed.

WtDPH = weight of dihydric phenol employed.

The actual percent epoxide was determined experimentally by titration with perchloric acid in glacial acetic acid by the liberation of hydrogen bromide generated by the addition of tetraethylammonium bromide in glacial acetic acid using crystal violet as an indicator. The epoxy groups react stoichiometrically with hydrogen bromide generated from the reaction of perchloric acid with tetraethyl ammonium bromide. When the epoxy groups have been reacted, the free hydrogen bromide causes the crystal violet to change color.

The glass transition temperature, Tg, was determined by the method of ASTM D3418-75 on cured specimens prepared in the following manner. A mixture of 10 grams of the resultant epoxy resin, 0.3 gram of dicyanandiamide and 0.01 gram of 2-methyl imidazole was melt mixed on a 100° C. hot plate for 3 minutes. The mixture was finely ground in a mortar and pestle. The powder was transferred to an aluminum weighing dish and cured at 175° C. for 2 hours.

The stroke cure reactivity was determined by the following procedure.

An acetone solution of epoxy resin is prepared by blending 10 grams of acetone with 30 grams of molten epoxy resin warmed to 80°-100° C. The solution is allowed to cool to room temperature and then 9 grams of a 10% solution of dicyandiamide in the monomethylether of ethylene glycol and 0.75 gram of a 10% solution of benzyldimethylamine (BDMA) in acetone is added (3 phr dicy, 0.25 phr BDMA). The solution is mixed well and allowed to stand at room temperature for a period of 2 hours. The catalyzed resin is then drawn in an eye dropper and placed on a hotplate at 175° C. ±1° C. The stop watch is immediately started. Allow sample to rest on the hotplate undisturbed for 60±1 seconds. At this point, begin stroking with a wooden spatula. Stroking should be done by pushing the resin puddle back and forth over an area about 1 square inch using the same side of the spatula in contact with the resin. The resin will thicken as it is continuously stroked. Eventually the resin will become stringly and immediately after, becomes a rubber gel that releases from the hotplate. This is the end point. Stop the stopwatch and record the reading. The fewer the number of seconds, the higher the reactivity.

The following examples are illustrative of the present invention, but are not to be construed as to limiting the scope thereof in any manner.

Various catalysts employed in the examples and comparative experiments were prepared by the following procedures.

CATALYST PROCEDURE A

To a single necked 100 ml round bottom flask (RBF) was charged the particular phosphonium catalyst precursor as a 70% solution in methanol. The particular acid employed was dissolved in methanol and charged to the RBF. The solvents and excess acetic acid were removed under vacuum while heating to a final temperature of 75° C. at 1 mm Hg. The resultant liquor was acetone washed thereby yielding a white solid phosphonium salt of the acid employed.

CATALYST PROCEDURE B

To a 500 ml single neck RBF was charged the particular precursor as a 70% solution in methanol. The particular acid employed was slowly added to the solution while swirling the flask. The solvent and excess acetic acid were removed under vacuum while heating to a final temperature of 120° C. at 1 mm Hg. The resultant product was acetone washed thereby yielding the phosphonium salt of the acid employed.

CATALYST PROCEDURE C

To a single neck 500 ml RBF was charged the phosphonium bicarbonate precursor in methanol. The particular acid employed was dissolved in methanol in a beaker and then slowly added to the RBF while swirling the RBF. Swirling was maintained until $CO_2$ evolution subsided. The solution was then rotoevaporated until a vacuum could be maintained at 1 mm Hg at 75° C. The resultant liquor was washed twice with acetone to remove excess acid impurities to yield a white solid phosphonium salt of the acid.

CATALYST PROCEDURE D

To a one inch diameter glass column equipped with a stopcock was charged a methanol slurry of 65 g (70% by weight $H_2O$) of an anion exchange resin in the acetate form (200–400 mesh; 0.8 meq. per ml resin bed; 3.5 meq. per dry gram; 70–78 wt. % moisture; styrene type quaternary ammonium; wet mesh range 80–200) available from BIO•RAD Laboratories as AG1-X2. A 5% solution in methanol of potassium hydroxide was slowly eluted through the column at a rate of 2 drops per second. The column was then washed with methanol until neutral to litmus paper. The phosphonium catalyst precursor, as a 70% solution in methanol, was then added to the column and slowly eluted through the ion exchange resin until the dark band was washed through the column. The eluted material was caught in a RBF containing an excess molar ratio of the acid. This solution was then rotoevaporated and acetone washed to yield a white solid phosphonium salt of the acid.

CATALYST PROCEDURE E

To a 4 oz bottle was charged 100 g (0.17 mol) of a 70% methanol solution of ethyltriphenylphosphonium acetate.acetic acid complex followed by the addition of 20.44 g (0.1622 mol) of oxalic acid dihydrate. The mixture was mixed until all of the oxalic acid had dissolved. The resultant solution contained about 51.14 wt. % ethyltriphenylphosphonium oxalate.

CATALYST PROCEDURE F

To a 2 gallon bottle was charged 1000 g (1.707 mol) of a 70% methanol solution of ethyltriphenylphosphonium acetate.acetic acid complex followed by the addition of 204.4 g (1.622 mol) oxalic acid dihydrate. The mixture was mixed until all of the oxalic acid had dissolved and then about 31.5 g of methanol was added to give a resultant solution of about 50 wt. % ethyltriphenylphosphonium oxalate.

The precursors and acids employed, reaction conditions and results are provided in the following Table I for which the abbreviations employed therein have the following meaning.

BTPP = butyltriphenylphosphonium
ClAc = chloroacetate
ETPP = ethyltriphenylphosphonium
ETPPAc.HAc = ethyltriphenylphosphonium acetate.acetic acid complex
$HCO_3$ = bicarbonate ture of the mixture reached 70° C., the desired amount of the specified phosphonium catalyst dissolved in methanol was added. The mixture was heated at the desired reaction conditions to give the resultant product.

EPOXY RESIN A

Epoxy Resin A was a liquid diglycidyl ether of bisphenol A having an average epoxide equivalent weight of about 189, % epoxide of about 22.75% and an aliphatic chloride content of about 3410 ppm.

EPOXY RESIN B

Epoxy Resin B was a liquid diglycidyl ether of bisphenol A having an average epoxide equivalent weight of about 188, % epoxide of about 22.82% and an aliphatic chloride content of about 3700 ppm.

EPOXY RESIN C

Epoxy Resin C was a liquid diglycidyl ether of bisphenol-A having an average epoxide equivalent weight of about 186.5, % epoxide of about 23.06 and an aliphatic chloride content of about 2200 parts per million.

DIHYDRIC PHENOL A

Dihydric phenol A was tetrabromobisphenol A having a phenolic hydroxyl equivalent weight of about 272 and percent bromine content of about 58.8%.

TABLE 1

| No. | CATALYST | PROCEDURE | ACID EMPLOYED TYPE | ACID EMPLOYED g/moles | ACID EMPLOYED pKa | PRECURSOR EMPLOYED TYPE | PRECURSOR EMPLOYED g/moles | PRECURSOR EMPLOYED pKa |
|---|---|---|---|---|---|---|---|---|
| 1 | BTPP FORMATE | C | Formic | 2.73/0.06 | 3.6 | $BTPPHCO_3$ | 13.2/0.035 | 6.5 |
| 2 | ETPP FORMATE | C | Formic | 2.73/0.06 | 3.6 | $ETPPHCO_3$ | 13.2/0.035 | 6.5 |
| 3 | ETPP FORMATE | D | Formic | 4.1/0.09 | 3.6 | ETPPAc.HAc | 3.5/0.009 | 4.6 |
| 4 | BTPP OXALATE | C | Oxalic | 2.47/0.027 | 1.3 | $BTPPHCO_3$ | 9.9/0.026 | 6.5 |
| 5 | ETPP PHOSPHATE | B | Phosphoric | 6.38/0.065 | 2.1 | ETPPAc.HAc | 26.7/0.0651 | 4.6 |
| 6 | ETPP SUCCINATE | B | Succinic | 14/0.119 | 4.2 | ETPPAc.HAc | 48.8/0.119 | 4.6 |
| 7 | ETPP MALONATE | B | Malonic | 1.56/0.016 | 2.85 | ETPPAc.HAc | 5.88/0.014 | 4.6 |
| 8 | ETPP OXALATE | A | Oxalic | 1.94/0.015 | 1.2 | ETPPAc,HAc | 6.3/0.015 | 4.6 |
| 9 | BTPPClAc | C | Chloro-acetic | 2.84/0.03 | 2.9 | $BTPPHCO_3$ | 9.9/0.026 | 6.5 |
| 10 | ETPP OXALATE | E | Oxalic | 20.44/0.1622 | 1.2 | ETPPAc.HAc | 70/0.171 | 4.6 |
| 11 | ETPPAc.HAc | Purchased from Cincinatti Milacron, Inc. | | | | | | |
| 12 | ETPP OXALATE | F | Oxalic | 204.4/1.622 | 1.2 | ETPPAc—HAc | 700/1.71 | 4.6 |

| No. | METHANOL SOLVENT (total Quant.) grams | REACTION TEMP. °C. | MELTING POINT AND YIELD °C./% | COMMENTS |
|---|---|---|---|---|
| 1 | 37 | 100 | 190/N.D.[1] | white solid |
| 2 | 37 | 100 | N.A.[2]/N.D. | brown liquid |
| 3 | 200 | 100 | N.A/95 | brown liquid |
| 4 | 35 | 75 | 155/78 | white solid |
| 5 | 11 | 25 | 175-189/100 | white solid |
| 6 | 21 | 120 | N.A./N.D. | brown liquid |
| 7 | 40 | 120 | N.A./N.D. | brown liquid |
| 8 | 23 | 70 | 151/91 | white solid |
| 9 | 13 | 75 | 212-215/76 | white solid |
| 10 | 30 | 25 | N.A./N.D. | mixture contains free acetic acid |
| 11 | N.A. | N.A. | N.A. | 70% solution in methanol |
| 12 | 81.6 | 25 | N.A./N.D. | mixture contains free acetic acid |

[1]N.D. — not determined
[2]N.A. = not applicable

GENERAL PROCEDURE FOR RESIN PREPARATION

To a reaction vessel equipped with a means for stirring, temperature control and indication and nitrogen purge was charged the desired weight of the specified liquid diglycidyl ether of bisphenol A and the desired weight of the specified dihydric phenol. The mixture was heated at a rate of 5° C./minute. When the tempera-

DIHYDRIC PHENOL B

Dihydric phenol B was a bisphenol A having a phenol hydroxyl equivalent weight of about 114.

EXAMPLES 1-21 and COMPARATIVE EXPERIMENTS A-G

The components, reaction conditions and results are given in the following Table II.

TABLE II

| EX. OR COMP. EXPT. NO. | EPOXY RESIN Type/ Equiv. | DI-HYDRIC PHENOL Type/ Equiv. | CATALYST Type/moles | REACTION CONDITIONS 1st Hour °C. | 2nd Hour °C. | 3rd Hour °C. | 4th Hour °C. | THEORY % EPOXIDE | ACTUAL % EPOXIDE | DIFF. IN % EPOXIDE | 175° C. STROKE CURE Sec. | Tg °C. |
|---|---|---|---|---|---|---|---|---|---|---|---|---|
| A | A/1.244 | A/0.422 | No. 10/0.0002 | 120 | 130 | 150 | 150 | 10.1 | 10 | 0.1 | 289 | 103 |
| B | A/1.164 | A/0.333 | No. 10/0.00022 | 120 | 130 | 150 | 150 | 11.5 | 11.48 | 0.02 | 320 | 109 |
| 1 | A/11.64 | A/3.33 | No. 10/0.0087 | 120 | 130 | 150 | 150 | 11.5 | 10.97 | 0.53 | 310 | 117 |
| 2 | A/11.64 | A/3.33 | No. 10/0.0174 | 120 | 130 | 150 | 150 | 11.5 | 10.9 | 0.6 | 305 | N.D.[2] |
| 3 | A/11.64 | A/3.33 | No. 10/0.013 | 120 | 130 | 150 | 150 | 11.5 | 10.76 | 0.74 | 305 | 121 |
| 4 | A/11.64 | A/3.33 | No. 10/0.0174 | 120 | 130 | 150 | 150 | 11.5 | 10.1 | 1.4 | 280 | 128 |
| 5 | A/11.64 | A/3.33 | No. 10/0.0256 | 120 | 130 | 150 | 150 | 11.5 | 10.05 | 1.45 | 268 | 131 |
| 6 | A/11.64 | A/3.33 | No. 10/0.0337 | 120 | 130 | 150 | 150 | 11.5 | 9.09 | 2.41 | 255 | 127 |
| C | A/1.06 | A/0.303 | No. 11/0.00024 | 120 | 130 | 150 | 150 | 11.5 | 11.5 | 0 | 340 | 110 |
| D | A/1.06 | A/0.232 | No. 11/0.00024 | 120 | 130 | 150 | 150 | 12.00 | 12 | 0 | 325 | 114 |
| 7 | A/1.335 | A/0.0359 | No. 11/0.00730 | 120 | 130 | 150 | 150 | 12.00 | 10.21 | 1.79 | 269 | 127 |
| 8 | A/1.06 | A/0.28 | No. 8/0.0026 | 120 | 130 | 150 | 150 | 12.00 | 10.3 | 1.7 | N.D. | N.D. |
| 9[1] | A/1.06 | A/0.28 | No. 11/0.0026 X[1]/0.0026 | 120 | 130 | 150 | 150 | 12.00 | 10.2 | 1.8 | N.D. | N.D. |
| 10 | A/23.12 | A/6.21 | No. 6/0.12 | 120 | 130 | 150 | 150 | 12.00 | 9.8 | 2.2 | N.D. | N.D. |
| 11 | A/11.45 | A3.07 | No. 5/0.0653 | 120 | 130 | 150 | 150 | 12.00 | 10.65 | 1.35 | N.D. | 130 |
| 12 | A/1.114 | A/0.3 | No. 9/0.00277 | 120 | 130 | 150 | 150 | 12.00 | 10.66 | 1.34 | 290 | 127 |
| 13 | A/1.09 | A/0.293 | No. 7/0.0038 | 120 | 130 | 150 | 150 | 12.00 | 11.00 | 1 | 293 | N.D. |
| 14 | B/1.06 | A/0.288 | No. 1/0.0041 | 150 | 150 | 150 | 150 | 11.89 | 8.6 | 3.29 | N.D. | N.D. |
| 15 | B/1.06 | A/0.285 | No. 3/0.003 | 120 | 130 | 150 | 150 | 12.00 | 10.00 | 2 | N.D. | N.D. |
| 16 | B/1.06 | A/0.285 | No. 4/0.0026 | 120 | 130 | 150 | 150 | 12.00 | 9.8 | 2.2 | N.D. | N.D. |
| 17 | B/1.06 | A/0.288 | No. 2/0.0032 | 150 | 150 | 150 | 150 | 11.89 | 10.2 | 1.69 | N.D. | N.D. |
| 18 | A/22.14 | B/7.94 | No. 10/0.0664 | 120 | 130 | 150 | 150 | 12.00 | 9.8 | 2.2 | 205 | 130 |
| E | A/1.04 | B/0.29 | No. 10/0.000097 | 150 | 150 | N.A.[3] | N.A. | 14.00 | 13.99 | 0.01 | 274 | N.D. |
| 19 | A/1.01 | B/0.28 | No. 10/0.00184 | 140 | 140 | 140 | 140 | 14.00 | 12.13 | 1.87 | 255 | N.D. |
| F | A/1.02 | B/0.72 | No. 10/0.000184 | 150 | 150 | 150 | N.A. | 4.65 | 4.39 | 0.26 | 300 | N.D. |
| 20 | A/1.58 | B/1.12 | No. 10/0.00288 | 155 | 155 | 155 | 155 | 4.65 | 3.51 | 1.14 | 280 | N.D. |
| G | A/1.01 | B/0.83 | No. 10/0.00028 | 150 | 150 | 150 | 150 | 2.70 | 2.46 | 0.24 | 255 | N.D. |
| 21 | A/1.01 | B/0.83 | No. 10/0.00185 | 195 | 195 | 195 | 195 | 2.70 | 1.70 | 1 | 164 | N.D. |
| 22 | C/88.36 | A/25.64 | No. 12/0.15 | 120 | 130 | 160 | N.A. | 11.50 | 10.00 | 1.50 | N.D. | 130 |

[1]Insitu preparation of catalyst (ETPP Oxalate) by adding the catalyst precursor (ETPPAc.HAc) plus acid (oxalic acid dihydrated X) to the mixture of epoxy resin and dihydric phenol.
[2]N.D. = not determined.
[3]N.A. = not applicable

EXAMPLE 23 (PREPARATION OF ELECTRICAL LAMINATE

A. Preparation of Prepreg Varnish Formulation

A prepreg varnish formulation was prepared by blending about 5411 g of a 75% solution by weight in acetone of the resin of example #22 with about 1225 g of a 10% solution of dicyandiamide in the monomethylether of ethylene glycol (~3 phr dicyandiamide), about 6.13 g of benzyldimethylamine (~0.15 phr BDMA) and about 200 g acetone. The viscosity of the solution at 25° C. was 25 seconds using a [190] #2 Zahn cup. The 175° C. stroke cure reactivity of the prepreg varnish was about 245 seconds.

B. Preparation of Laminate

Fiberglass cloth (type 7628 with I399 finish) was impregnated by passing it through the prepreg varnish described in A above, followed by a pair of doctor bars set at 15 mils clearance to control resin pickup, and finally through an oven at 300° F. for a dwell time of approximately 4 minutes. The resulting B-staged impregnated cloth of prepreg had a gel time of 93 seconds at 175° C.

A laminate was then prepared from the above prepared preimpregnated fiberglass employing 6 plys of 12 in.×12 in.×0.13 in. (3 cm×3 cm×0.33 mm) sheets of 7628 style glass all of which were I399 finish. The laminate was prepared by pressing at 500 psig (3500 kg/cm$^2$) for 60 minutes at 175° C. The laminate was then tested.

The pressure cooker-solder test was conducted by (i) cutting 2 in.×4 in. coupons from prepared [laminate] *laminate,*

(ii) placing 3 coupons edgewise on a rack in a pressure cooker and maintaining 15 psig steam pressure for ~1.5 hour, and (iii) then immersing the coupons in 500° F. solder for 20 seconds.

Six sides of the 3 coupons were evaluated and rated by the number of sides passing. In order to pass [.] the side must be free of blisters after immersion in hot solder. A ½ side pass consisted of the side having only 1 edge blister.

The laminate had a glass transition temperature (Tg) of 130° C. After subjecting to 15 psig steam pressure for 1½ hours and immersion in 500° F. solder for 20 seconds, 5½ sides of the laminate out of six sides passed the test.

We claim:

1. In a process for advancing epoxy resins in molecular weight by reacting (A) an epoxy resin which is a glycidyl ether of a dihydric phenol having an average of more than one glycidyl ether group per molecule with (B) a dihydric phenolic compound in the presence of (C) a phosphonium catalyst employing components (A) and (B) in quantities such that the phenolic hydroxyl to epoxide equivalent ratio is that which will provide a theoretical percent epoxide of the resultant reaction product of from about 2.7 to about 14; the improvement which comprises employing the catalyst, component (C), in a quantity such that the epoxy resin which would result when subjecting a mixture of components (A), (B) and (C) to suitable reaction conditions produces an advanced epoxy resin wherein the difference obtained by subtracting the percent epoxide obtained by analysis from the theoretical percent epoxide is from about [0.5] *0.74* to about 4; thereby providing an epoxy resin which when cured with a curing quantity of a curing agent provides a composition which has an improvement in one or more of the properties selected from the group consisting of glass transition temperature and increased reactivity.

2. The process of claim 1 wherein (a) components (A) and (B) are employed in quantities which will provide a theoretical percent epoxide of the resultant reaction product of from about 7 to about 12.5 and (b) the difference obtained by subtracting the percent epoxide obtained by analysis from the theoretical percent epoxide is from about 1 to about 2.

3. The process of claim 2 wherein component (A) is a glycidyl ether of bisphenol A having an average epoxide equivalent weight of from about 156 to about 400 and component (B) is bisphenol A.

4. The process of claim 3 wherein component (A) has an average epoxide equivalent weight of from about 177 to about 190.

5. The process of claims 1, 2, 3 or 4 wherein the cation portion of said phosphonium catalyst is represented by the formula

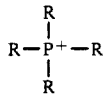

wherein each R is independently a hydrocarbyl or substituted hydrocarbyl group having from about 1 to about 20 carbon atoms at least one of which contains an aromatic ring attached directly to the phosphorus atom.

6. The process of claim 5 wherein said hydrocarbyl groups have from 1 to about 6 carbon atoms and at least two of such R groups contain an aromatic ring attached directly to the phosphorous atom and wherein the anion portion of the phosphonium catalyst is a halide, carboxylate, dicarboxylate, phosphate, nitrate, sulfate, nitrite, sulfite, borate or chromate.

7. The process of claim 6 wherein the anion is a dicarboxylate.

8. The process of claim 7 wherein the catalyst is ethyl triphenyl phosphonium oxalate.

9. The process of claim 6 wherein the anion is a carboxylate.

10. The process of claim 9 wherein the catalyst is ethyl triphenyl phosphonium formate.

11. The process of claims 7 [or 8] wherein the catalyst is formed insitu from a dicarboxylic acid and a phosphonium compound having the actate.acetic acid complex as the anion.

*12. The process of claim 8 wherein the catalyst is formed insitu from a dicarboxylic acid and a phosphonium compound having the acetate.acetic acid complex as the anion.*

* * * * *